Sept. 7, 1948. A. E. SMITH 2,448,632
SUCTION MOLD
Filed July 28, 1943 2 Sheets-Sheet 1
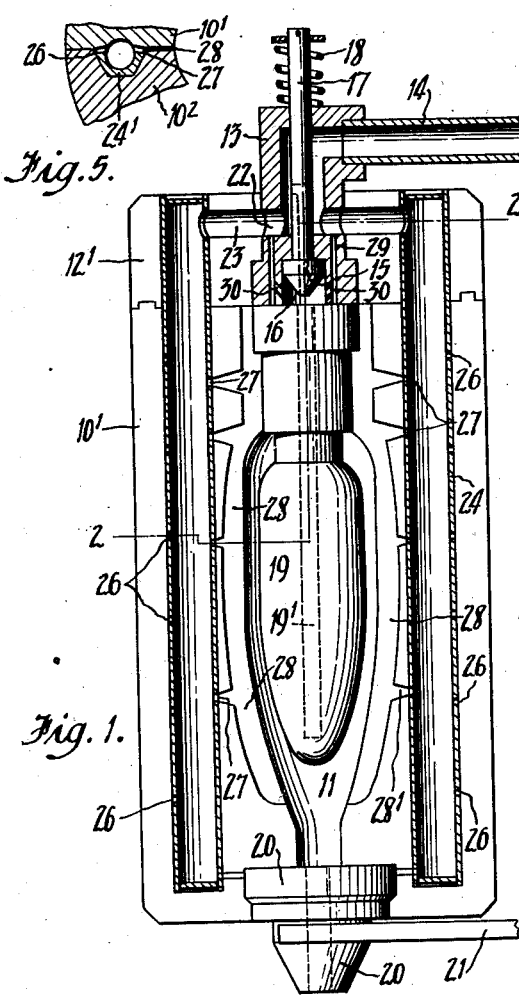
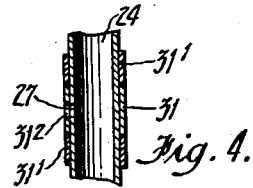
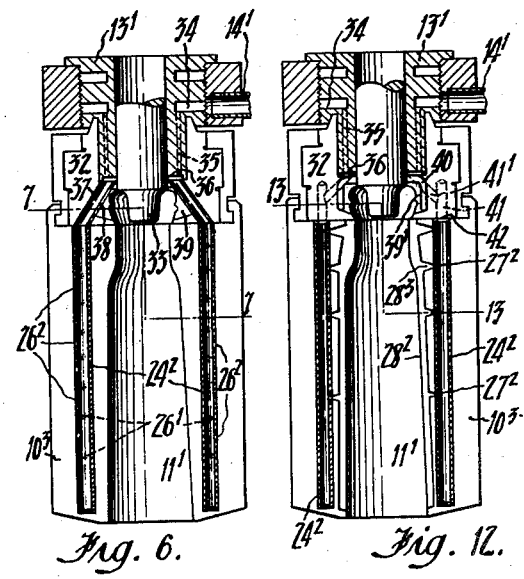
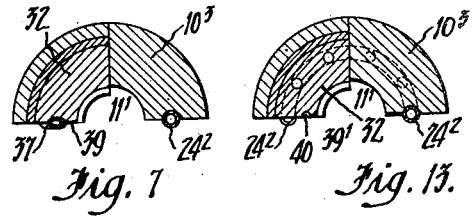
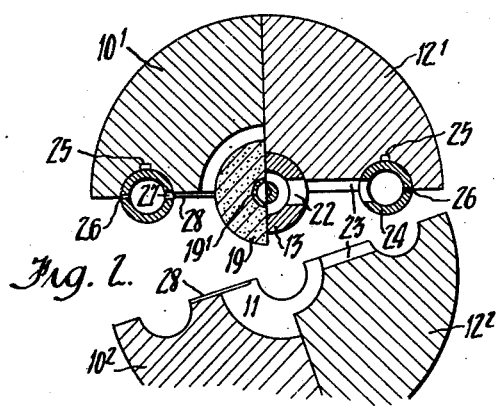
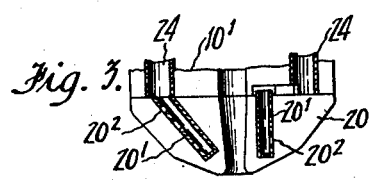
INVENTOR
ARTHUR E. SMITH Sept. 7, 1948.  A. E. SMITH  2,448,632
SUCTION MOLD
Filed July 28, 1943  2 Sheets-Sheet 2
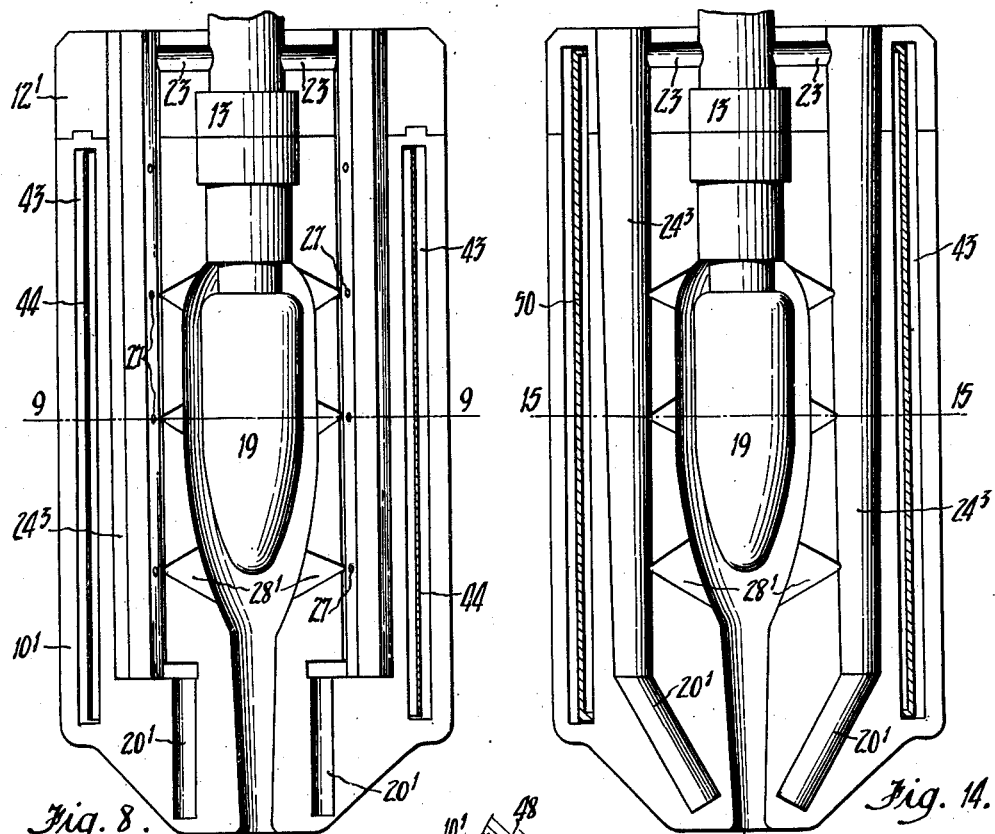
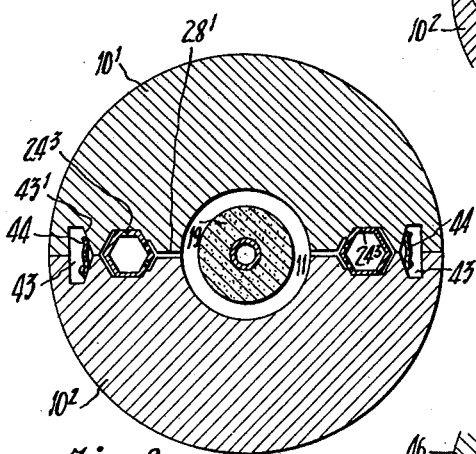
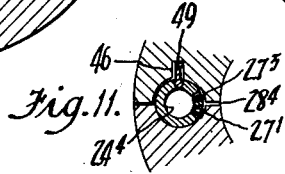
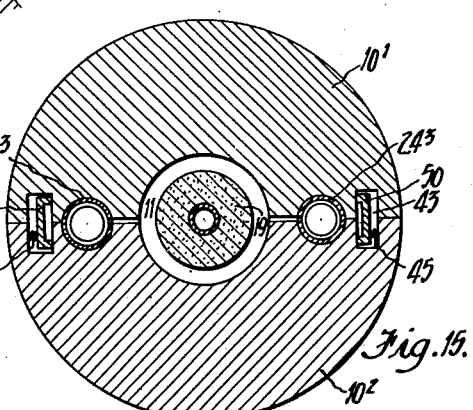
INVENTOR
ARTHUR E. SMITH Patented Sept. 7, 1948

2,448,632

UNITED STATES PATENT OFFICE 2,448,632

SUCTION MOLD

Arthur Edgar Smith, Darling Point, Sydney, New South Wales, Australia

Application July 28, 1943, Serial No. 496,496
In Australia April 11, 1942

17 Claims. (Cl. 49—65)

This invention relates to improvements in suction moulds for use in the formation of articles from molten glass, molten metal and other mouldable materials.

One object of the invention is to provide improved means of simple and effective construction to facilitate the removal of air from divided suction moulds whereby molten metal, glass or other mouldable material will be drawn thereinto, while another object is to provide improved means for preventing leakage of air from the atmosphere through the joints between the mould sections into the mould cavity.

It is a common practice to form longitudinally extending grooves in the coacting faces of the sections of divided moulds used in suction glass machines whereby, when the mould sections are closed, adjacent grooves coact to form air withdrawal passages which are arranged one at each side of the mould cavity. The said coacting faces of the mould sections are relieved between said grooves and the mould cavity whereby said grooves communicate with the cavity by means of narrow slits, which usually are continuous and extend for almost the full length of the mould cavity.

The upper ends of the aforesaid air withdrawal grooves communicate with passages in a divided neck mould and such passages in turn communicate through valve means with a source of reduced pressure. In operation the open lower end of the mould is dipped into a bath of molten glass and air is exhausted from the mould cavity through the aforesaid passages whereby molten glass is drawn upwardly to fill the cavity. At the same time the major portion of the air which leaks inwardly through the joint between the mould sections, is withdrawn through the longitudinally disposed air passages and is thus prevented from entering the mould cavity.

Apparatus in accordance with the present invention broadly resides in a divided suction mould having a longitudinally disposed suction tube arranged at each side of the mould cavity and accommodated, when the mould is closed, in corresponding grooves formed in the adjacent faces of the mould sections, each said tube being formed with one or a plurality of spaced openings which communicate with the joint between the mould sections.

Each suction tube is preferably carried on one of the mould sections and it may be integral therewith.

The said openings in the suction tubes may be arranged in communication with the mould cavity whereby the latter may be exhausted therethrough and the same openings may also be utilized to withdraw inwardly leaking air, though additional openings may be provided for this purpose. Alternatively openings may be provided in the suction tubes primarily for the interception of inwardly leaking air.

Preferably the suction tubes are fixed to one of the mould sections for movement in unison therewith.

Another feature of the invention resides in the provision of auxiliary sealing means arranged outwardly of the inner portions of the suction tubes to assist in preventing leakage of air into the mould cavity. Said sealing means may comprise longitudinally disposed sealing strips mounted on the mould sections and arranged to bear against said suction tubes. Alternatively said sealing strips may be arranged to bridge the joint between the mould sections outwardly of said suction tubes.

In the drawings which show illustrative forms of the invention:

Figure 1 is a view in elevation with parts in section, of one section of a suction mould and appurtenant parts for casting articles of metal.

Figure 2 is a view in sectional plan taken on the line 2—2 of Figure 1, and shows the cooperating mould section.

Figure 3 is a fragmentary sectional view showing a modified form of suction nozzle.

Figure 4 is a fragmentary sectional view showing regulating means for a suction tube.

Figure 5 is a fragmentary sectional plan view and shows a suction tube integral with one mould section.

Figure 6 is a view similar to Figure 1 and shows one section of a suction mould for molten glass.

Figure 7 is a view in sectional plan taken on the line 7—7 of Figure 6.

Figure 8 is an elevational view with parts in section similar to Figure 1 and shows further modifications.

Figure 9 is a view in sectional plan taken on the line 9—9 of Figure 8.

Figures 10 and 11 are fragmentary views in sectional plan and show alternative sealing means.

Fig. 12 is a view similar to Fig. 6 and shows an alternative construction.

Fig. 13 is a view in sectional plan taken on the line 13—13 of Fig. 12.

Fig. 14 is a view similar to Fig. 8 and shows a further modification; and

Fig. 15 is a sectional plan view on the line 15—15 of Fig. 14.

Referring now to Figures 1 and 2 of the drawings, $10'$ and $10^2$ designate the co-operating sections of a divided suction mould having a central mould cavity 11 therein. One section $12'$ of a divided mould head is secured to the upper end of the mould section $10'$ and a similar mould head section is secured to the upper end of the mould section $10^2$. The mould sections are hingedly connected but the hinge is not shown.

The mould head has a central opening which neatly receives a suction head 13 which depends from a vacuum pipe 14 and a vertically reciprocable core engaging member 15 is arranged within a compartment 16 at the lower end of the suction head, this member 15 having an upwardly extending stem 17 arranged to be operated by appropriate means (not shown) in opposition to a spring 18.

When required, a core 19 may be suspended within the mould cavity 11 the upper end of the core being supported between the upper ends of the mould sections $10'$ and $10^2$. This core may be formed of core sand or other porous material in which case it is preferably provided with a central perforated tube $19'$ the open upper end of which freely communicates with the compartment 16 in the suction head.

A suction nozzle 20 has its upper portion embraced by the lower portions of the mould sections $10'$ and $10^2$ and an axial passage in the nozzle, communicates freely with the mould cavity 11. The suction nozzle may be supported, before the mould is closed, on a fixed forked bracket 21.

In Figure 2 of the drawings, the mould section $10^2$ is shown in the open position while the section $10'$ is shown in the closed position in which it engages the core 19.

The interior of the suction head 13 communicates by lateral holes 22 with lateral grooves 23 in the mating faces of the mould head sections whereby, when the mould is closed, these grooves coact to form lateral air withdrawal passages.

The outer ends of these lateral grooves 23 communicate with upper portions of longitudinally disposed grooves which are disposed one at each side of the mould cavity and which extend from the upper ends of the mould head sections to adjacent the lower ends of the body mould sections $10'$ and $10^2$.

These longitudinally disposed grooves are of semi-circular shape in cross section to neatly accommodate longitudinally disposed suction tubes 24 which are closed at their upper and lower ends and which are provided adjacent their upper ends with lateral holes arranged to register with the lateral grooves 23 in the sections of the mould head. The suction tubes are preferably retained to one of the mould sections by means of pins 25 (Figure 2) or other approved means whereby said tubes move in unison therewith. If desired the suction tubes may be secured to the desired mould section by suitable sealing material to prevent the passage of air therearound.

Each suction tube 24 is provided outwardly of the axis thereof and in the plane of the joint between the mould sections, with a plurality of spaced air holes 26 which serve to intercept air which leaks inwardly through the joint between the mould sections when the mould cavity is exhausted as hereinafter described.

Likewise each suction tube 24 is provided inwardly of the axis thereof and in the plane of the joint between the mould sections with a plurality of spaced air holes 27. The meeting faces of the mould sections $10'$ and $10^2$ are relieved as indicated at 28 whereby, when the mould is closed, narrow slits (shown of exaggerated width in Figure 2) formed thereby communicate with the mould cavity 11 and extend for the greater part of the length thereof. These slits are shown as being continuous, but they may be discontinuous if desired.

The relieved portions 28 of the mating faces of the mould sections are formed with outward extensions $28'$ which communicate with the inner series of air holes 27 in the suction tubes 24.

The suction head is formed with vertical passages 29 which communicate at their upper ends with the lateral holes 22 therein and these passages 29 communicate by inclined holes 30 with the lower compartment 16 of the suction head above the head of the core 19.

In operation the suction nozzle 20 is dipped into a bath of molten metal and the vaccum pipe 14 is connected to a source of reduced pressure. Air is thus withdrawn from the mould cavity 11 through the said longitudinal slits formed between the relieved faces 28 of the mould sections, then through the holes 27 in the suction tubes 24, through these tubes and the lateral grooves 23 to the suction head.

When a porous core 19 is used, air is simultaneously withdrawn from the mould cavity through said core, the compartment 16 of the suction head and the communicating passages 30 and 29 therein.

Thus molten metal is drawn into and fills the mould cavity.

Air which leaks inwardly through the joint between the mould sections passes into the suction tubes 24 through the holes 26 and so is prevented from entering the mould cavity 11.

By means of the construction described, suction may be applied to such portion or portions of the mould cavity where experience shows that the best results are obtained while additionally it has been found that inward leakage of air, due for example to warping of the mould sections, is better avoided by the use of suction tubes as 24 than is the case with constructions heretofore used.

It is to be understood, however, that the air withdrawal holes 26 and 27 are not necessarily arranged as shown in Figures 1 and 2 and certain modified arrangements are shown in Figures 6, 7, 12 and 13 hereinafter described.

The suction tubes 24 also assist in locating the mould sections in their correct relative positions when the mould is closed.

For some purposes it is advantageous to provide means for closing or regulating the effective areas of some of the air holes 26 and/or 27 in the suction tubes 24 and one construction for this purpose is shown in Figure 4 in which the suction tube is fitted with a rotatable ring 31 which is retained in position by fixed collars $31'$, the ring 31 having a hole $31^2$ which may be moved into and out of register with the hole 27. A ring as 31 would be provided for each hole which may require regulation.

In the modification shown in Figure 3, the suction nozzle 20 is of divided construction, one section thereof only being shown. The sections of the suction nozzle are secured to the respective mould sections whereby they open and close in unison therewith. Suction tubes $20'$ are located between the sections of the nozzle, two somewhat different arrangements being shown and the upper ends of these tubes communicate with the lower ends of the suction tubes 24. Holes 20² in the suction tubes 20' serve to intercept inwardly leaking air.

In the modification shown in Figure 5 the suction tube is integral with the mould section 10'—that is to say, the face of the mould section 10' is formed with a longitudinally extending projection 24' provided with a central air passage which communicates by lateral holes 26 and 27 with the joint between the mould sections.

Figures 6 and 7 show the invention applied to a divided suction mould for a glass fabricating machine, one half only of the mould being shown. Thus the body mould section 10³ provided with a mould cavity 11', is arranged to close about a similarly divided ring mould, 32, which is recessed to accommodate a suction head 13' fitted with a reciprocable mouth forming plunger 33.

A vacuum pipe 14' communicates with a cavity 34 in the suction head which in turn communicates with passages 35 leading to an annular groove 36 in the lower end of the suction head.

A short inclined suction tube 37 is partly received into a groove in the face of the ring mould section 32 at each side of the mould cavity and the mating section, which is not shown, is similarly grooved to embrace the protruding portions of the tubes 37 when the ring mould is closed.

Each suction tube 37 is open at its upper and lower ends and the lower end thereof is flush with the lower end of the ring mould section 32. A narrow slot 38 is formed in the inner side of each tube 37 in the plane of the joint and this slot communicates by a narrow slit 39 with the cavity in the ring mould, such slit being formed by relieving appropriate portions of the mating faces of the ring mould sections.

A suction tube 24² is arranged longitudinally below the lower end of the tube 37 such tube 24² being partly received in a groove in the mould section 10³ as in the construction previously described. The lower end of the tube 24² is closed while its upper end is open and is disposed substantially in contact with the lower end of the tube 37 when the mould is closed.

A series of air holes 26² is formed in the outer side of the tube 24² and in the plane of the joint for the purpose of intercepting inwardly leaking air as previously described. It is not essential that these holes 26² be in the plane of the joint as they may be located in any desired positions in communication with the interstice between the tube and the mould section. Thus, for example, they may be arranged as shown at 26' in Figure 6.

The principal function of the suction tubes 24² as shown in Fig. 6 is to intercept inward leakage of air as the mould cavity is exhausted wholly or mainly through the slits 39 in the ring mould. However, as it is not possible to insure that the portions of the joints inwardly of the suction tubes will be air-tight, it will be evident that some air from the mould cavity will also be exhausted through the suction tubes 24².

In the modification shown in Figures 12 and 13, the mating faces of the ring mould are formed with grooves 40 the upper ends of which communicate with the annular grooves 36 at the lower end of the suction head. The mating faces of the ring mould sections are relieved at 39' inwardly of the grooves to form an air withdrawal slit.

The ring mould sections are also provided with passages 41, which communicate at their upper ends by inclined passages 41' with the annular groove 36 in the base of the suction head and at their lower ends with an annular groove 42 in the upper end of the sections of the body mould.

Suction tubes 24² are mounted in the mould section 10³ as hereinbefore described and their upper ends communicate with the annular groove 42. Each tube 24² in the arrangement shown is provided in the plane of the joint between the mould sections and at the inner side of said tube with a plurality of air withdrawal holes 27² which communicate with the mould cavity 11 through slits located between the relieved portions 28² and 28³ of the mating faces of the mould sections.

It will be noted that, in this case, the suction tube 24² is not provided with special holes for the interception of inwardly leaking air. If, as is intended, the tubes fit neatly into the grooves in the mould sections, very little air will leak inwardly therearound while any air which does enter in this way will be removed through the holes 27².

It will be understood the moulds shown in Figures 6 and 12 may alternatively be provided with suction tubes provided with holes 26² and 27² and cooperating passages as shown in Figure 1, and likewise that the mould shown in Figure 1 may be provided with suction tubes in accordance with either of the modifications shown in Figs. 6 and 12.

It will be evident that the suction tubes 24, or 24² and the accommodating grooves may be of other than circular shape in cross section. For example, the suction tubes 24³ shown in Figures 8 and 9 are of hexagonal shape in cross section and suction tubes of square or other suitable cross sectional shapes may likewise be used. The suction tubes 24³ shown in Figures 14 and 15 are of circular shape in cross section but same taper downwardly.

In order further to restrict the ingress of air through the joint between the mating faces of the mould sections and around the suction tubes 24 or 24², auxiliary sealing means may be provided to seal the joints outwardly of the said tubes, one suitable construction being shown in Figures 8 and 9. Thus in these figures, coacting longitudinally disposed slots 43 are formed in the faces of the mould sections outwardly of the adjacent suction tube 24³. A longitudinally disposed flexible sealing strip 44 bridges the joint within the slots 43. One longitudinal edge of this strip is secured to one of the mould sections while the other longitudinal edge or adjacent portion thereof bears resiliently against an inclined face 43' forming the inner end of the slot 43 in the coacting mould section whereby a substantially air-tight joint is formed therebetween.

In the alternative construction shown in Figures 14 and 15, a rigid sealing strip 50 located within the slots 43 bridges the joint between the mould sections and its longitudinal and lower edges are pressed into sealing contact therewith by springs 45.

In lieu of arranging said auxiliary sealing means outwardly of the suction tubes 24³ as shown in Figures 8, 9, 14 and 15, auxiliary sealing members may extend between the suction tubes and the mould sections or one of them, two illustrative constructions being shown in Figures 10 and 11.

Thus in Figure 10 longitudinal slots 46 are formed in the mould sections in alignment with and on opposite sides of the suction tube 24⁴ and rigid sealing blades 47 slidably mounted therein are pressed into contact with the suction tube by springs 48.

In the alternative construction shown in Figure 11, a longitudinally disposed sealing vane 49 is pivotally mounted on the suction tube 24⁴ and extends approximately radially therefrom into a slot 46. When the mould cavity is evacuated, the pressure of the atmosphere on the outer face of the vane 49 causes the latter to make sealing contact with the inner face of the slot 46 as shown. It is assumed in this construction that the suction tube 24⁴ is fixed to the other mould section in an air-tight manner, but if desired a vane as 49 may be mounted in each mould section.

The suction tubes 24⁴ in Figures 10 and 11 are formed with a plurality of groups of radially arranged holes 27³, the outer ends of which communicate with a narrow arcuate recess 27′ which in turn communicates with the slit 28⁴ between the mould sections.

I claim:

1. A suction mould having a mould cavity therein and comprising at least two separable sections which coact to form a joint when the mould is closed, a suction tube arranged in said joint one at least of said mould sections having a groove into which said suction tube projects when the mould is closed, said suction tube having at least one opening in the wall thereof whereby the interior thereof communicates with said joint, and means forming an air withdrawal passage which communicates with one end of said suction tube whereby the interior of said tube may be placed in communication with a source of reduced pressure.

2. A suction mould having a mould cavity therein and comprising at least two separable sections, coacting faces on said sections forming a joint therebetween, said coacting faces having coacting aligned grooves therein, a suction tube located in the cavity formed by said coacting grooves, said suction tube having at least one opening in the wall thereof whereby the interior thereof communicates with said joint and means forming an air withdrawal passage which communicates with the interior of said suction tube whereby the interior of said tube may be placed in communication with a source of reduced pressure.

3. A suction mould having a mould cavity therein and comprising at least two separable sections, mating faces on said sections forming a joint therebetween, a longitudinally extending hollow element projecting from an intermediate portion of one of said mating faces and removably received in a groove in the coacting mating face, said hollow element having at least one lateral opening therein whereby the interior thereof communicates with the said joint, and means forming an air withdrawal passage which communicates with the interior of said hollow member.

4. A suction mould having a mould cavity therein and comprising at least two separable sections, mating faces on said sections forming a joint therebetween a longitudinally extending hollow member located in the said joint and spaced from the adjacent portion of the mould cavity, said hollow member projecting from one of said mating faces into a groove in the coacting face and having at least one lateral opening therein whereby the interior thereof communicates with said joint, and said mating faces being relieved between said hollow member and the adjacent portion of the mould cavity to form an air withdrawal slit, and means forming an air withdrawal passage which communicates with the interior of said hollow member.

5. A suction mould having a mould cavity therein and comprising at least two separable sections, mating faces on said mould sections forming a joint therebetween, one of said mating faces being formed with a groove which is spaced from the adjacent portion of the mould cavity, a suction tube partly received in said groove and projecting therefrom, means retaining said suction tube to said grooved mould section, the coacting mould section having a groove removably accommodating the projecting portion of the suction tube, the wall of said suction tube being formed with at least one lateral hole whereby the interior of said tube communicates with said joint and said suction tube having at least one other opening therein whereby the interior thereof may be connected to a source of reduced pressure.

6. A suction mould having an elongated mould cavity therein and comprising two separable longitudinally disposed mould sections, two coacting pairs of mating faces on said mould sections arranged one at each side of the mould cavity and forming joints between said sections, and a pair of longitudinally disposed suction tubes disposed one at each side of the mould cavity and accommodated in longitudinally disposed grooves in the respective coacting pairs of mating faces, each suction tube having at least one lateral opening in the wall thereof whereby the interior of the tube communicates with the respective joint, and each of said suction tubes having an additional opening whereby the interior thereof may communicate with a source of reduced pressure.

7. A suction mould having an elongated mould cavity therein and comprising two separable longitudinally disposed mould sections, two coacting pairs of mating faces on said mould sections arranged one at each side of the mould cavity, and forming joints between said sections, and a pair of longitudinally disposed suction tubes disposed one at each side of the mould cavity, and accommodated in longitudinally disposed grooves in the respective coacting pairs of mating faces, each of said suction tubes extending for substantially the full length of the mould cavity and having in the wall thereof a plurality of longitudinally spaced lateral openings whereby the interior of each tube communicates with the respective joint, and each of said suction tubes having adjacent one end thereof a further opening whereby the interior thereof may communicate with a source of reduced pressure.

8. A suction mould having an elongated mould cavity therein and comprising two separable longitudinally disposed mould sections, two coacting pairs of mating faces on said mould sections arranged one at each side of the mould cavity and forming joints between said sections, and a pair of longitudinally disposed suction tubes disposed one at each side of the mould cavity, and accommodated in longitudinally disposed grooves in the respective coacting pairs of mating faces, each of said suction tubes extending for substantially the full length of the mould cavity, and having in the wall thereof a plurality of longitudinally spaced lateral openings whereby the interior of each tube communicates with the respective joint, each of said suction tubes having adjacent one end thereof a further opening whereby the interior thereof may communicate with a source of reduced pressure, and portions of said mating faces between the respective suction tubes and the mould cavity being spaced from each other when the mould is closed whereby air withdrawal slits are formed therebetween.

9. A suction mould having an elongated mould cavity therein and comprising two separable longitudinally disposed mould sections, two coacting pairs of mating faces on said mould sections arranged one at each side of the mould cavity and forming joints between said sections, and a pair of longitudinally disposed suction tubes disposed one at each side of the mould cavity and accommodated in longitudinally disposed grooves in the respective coacting pairs of mating faces, each of said suction tubes extending for substantially the full length of the mould cavity and having in the wall thereof adjacent the said joint and the mould cavity a plurality of longitudinally spaced lateral openings for the withdrawal of air from the mould cavity, portions of said mating faces between the respective suction tubes and the mould cavity being spaced from each other when the mould is closed to form air withdrawal slits which extend from said lateral openings to the mould cavity, said suction tubes having additional openings in the walls thereof to intercept air which leaks inwardly through the respective joints and each of said suction tubes having an opening adjacent one end thereof whereby the interiors of said tubes may be placed in communication with a source of reduced pressure.

10. A suction mould having an elongated mould cavity therein and comprising two separable longitudinally disposed mould sections, two coacting pairs of mating faces on said mould sections arranged one at each side of the mould cavity and forming joints between said sections, and a pair of longitudinally disposed suction tubes disposed one at each side of the mould cavity and accommodated in longitudinally disposed grooves in the respective coacting pairs of mating faces, each suction tube having at least one lateral opening in the wall thereof whereby the interior of the tube communicates with the respective joint, said mould having individual branch passages communicating with the interior of said suction tubes and means forming a common air withdrawal passage, said mould being formed with branch passages which connect said common air withdrawal passage with the interior passages of said suction tubes.

11. A suction mould having an elongated mould cavity therein and comprising two separable longitudinally disposed mould sections, two coacting pairs of mating faces on said mould sections arranged one at each side of the mould cavity, and forming joints between said sections, and a pair of longitudinally disposed suction tubes disposed one at each side of the mould cavity, and accommodated in longitudinally disposed grooves in the respective coacting pairs of mating faces, each of said suction tubes extending for substantially the full length of the mould cavity and having in the wall thereof adjacent the mould cavity a plurality of longitudinally spaced lateral openings which communicate freely with the mould cavity, each said suction tube having in the wall thereof a plurality of additional longitudinally spaced lateral openings arranged to intercept air which leaks inwardly through the respective joint, and each of said suction tubes having adjacent one end thereof a further opening whereby the interior thereof may communicate with a source of reduced pressure.

12. A suction mould having an elongated mould cavity therein and comprising two separable longitudinally disposed body mould sections and two cooperating ring mould sections, two coacting pairs of mating faces on said body mould sections arranged one at each side of the mould cavity and forming joints between said sections, and a pair of longitudinally disposed suction tubes disposed one at each side of the mould cavity, and accommodated in longitudinally disposed grooves in the respective coacting pairs of mating faces, each of said suction tubes extending for substantially the full length of the mould cavity from the adjacent ends of the ring mould sections and having in the wall thereof a plurality of longitudinally spaced lateral openings whereby the interior of each tube communicates with the respective joint between the body mould sections, two coacting pairs of mating faces on the ring mould sections arranged one at each side of the mould cavity and forming joints between said ring mould sections, said ring mould sections being formed with air withdrawal passages which communicate with the adjacent ends of the suction tubes, the ends of said air withdrawal passages remote from the suction tubes being arranged for connection to a source of reduced pressure.

13. A suction mould having an elongated mould cavity therein and comprising two separable longitudinally disposed body mould sections and two cooperating ring mould sections, two coacting pairs of mating faces on said body mould sections arranged one at each side of the mould cavity and forming joints between said sections, and a pair of longitudinally disposed suction tubes disposed one at each side of the mould cavity, and accommodated in longitudinally disposed grooves in the respective coacting pairs of mating faces, each of said suction tubes extending for substantially the full length of the mould cavity from the adjacent ends of the ring mould sections and having in the wall thereof a plurality of longitudinally spaced lateral openings whereby the interior of each tube communicates with the respective joint between the body mould sections, two coacting pairs of mating faces on the ring mould sections arranged one at each side of the mould cavity and forming joints between said ring mould sections, a further pair of suction tubes arranged one at each side of the ring mould cavity and accommodated in coacting grooves in the respective mating faces of the ring mould when the latter is closed, each further suction tube communicating at one end with the corresponding suction tube in the body mould and having in the wall thereof at least one lateral opening which communicates, when the ring mould is closed, with the corresponding joint between the sections thereof, and means forming air withdrawal passages which communicate with the ends of said further suction tubes remote from the body mould.

14. A suction mould having an elongated mould cavity therein and comprising two separable longitudinally disposed mould sections, two coacting pairs of mating faces on said mould sections arranged one at each side of the mould cavity and forming joints therebetween, a longitudinally disposed hollow member projecting from one of each pair of cooperating mating faces, each hollow member being removably accommodated in a groove in the coacting mating face when the mould is closed, said hollow member having in the wall thereof a plurality of longitudinally spaced lateral openings which communicate with the respective joint between the mould sections, means forming air withdrawal passages which communicate with the central passages in said hollow members, and auxiliary sealing means movably arranged in each joint outwardly of the said lateral openings in the respective hollow member to minimize inward leakage of air thereto through said joint.

15. A suction mould having an elongated mould cavity therein and two separable longitudinally disposed mould sections, two coacting pairs of mating faces on said mould sections arranged one at each side of the mould cavity and forming joints therebetween, a longitudinally disposed suction tube at each side of the mould cavity and accommodated in corresponding grooves in the respective mating faces, at least one lateral hole in the wall of each suction tube whereby the interior of the tube communicates with the respective joint between the mould sections, means forming air withdrawal passages communicating with the central passages in said suction tubes and a movable longitudinally disposed sealing strip arranged at each side of the mould cavity and bridging the respective joint between and sealingly engaging the mould sections when the mould is closed, each said sealing strip being disposed outwardly of the respective suction tube,
whereby when air is exhausted from the joint by the respective suction tube, the preponderative atmospheric pressure on the outer face of said sealing strip assists in maintaining same in sealing engagement with said mould sections.

16. A suction mould according to claim 15 wherein each said longitudinally disposed sealing strip is accommodated in coacting grooves formed in the respective mating faces of the mould sections.

17. A suction mould according to claim 15 having means retaining each sealing strip to one of said mould sections, and means resiliently pressing each sealing strip against the coacting mould section.

A. E. SMITH.

REFERENCES CITED

The following references are of record in the file of this patent:

UNITED STATES PATENTS

| Number | Name | Date |
|---|---|---|
| 1,223,392 | Kadow | Apr. 24, 1917 |
| 1,792,988 | Kadow | Feb. 17, 1931 |
| 1,879,872 | Hofmann | Sept. 27, 1932 |
| 2,175,407 | Peiler | Oct. 10, 1939 |